United States Patent
Seitz (10) Patent No.: US 7,980,529 B2
(45) Date of Patent: Jul. 19, 2011

(54) VACUUM GATE VALVE HAVING A LIMB ELEMENT

(75) Inventor: Daniel Seitz, Balgaeh (CH)

(73) Assignee: Vat Holding AG, Haag (CH)

( * ) Notice: Subject to any disclaimer, the term of this patent is extended or adjusted under 35 U.S.C. 154(b) by 388 days.

(21) Appl. No.: 12/135,751

(22) Filed: Jun. 9, 2008

(65) Prior Publication Data
US 2008/0302989 A1 Dec. 11, 2008

(30) Foreign Application Priority Data
Jun. 8, 2007 (CH) .................................. 0908/07

(51) Int. Cl.
*F16K 25/00* (2006.01)
(52) U.S. Cl. .................... 251/203; 251/175; 251/193
(58) Field of Classification Search .............. 251/176, 251/193, 203, 204
See application file for complete search history.

(56) References Cited

U.S. PATENT DOCUMENTS

| | | | |
|---|---|---|---|
| 2,841,361 A | 7/1958 | Palmer | |
| 3,321,174 A * | 5/1967 | Schertler | 251/65 |
| 4,491,145 A | 1/1985 | Williams et al. | |
| 5,415,375 A | 5/1995 | Gaboriault | |
| 5,415,376 A | 5/1995 | Ito | |
| 5,641,149 A | 6/1997 | Ito | |
| 5,755,255 A | 5/1998 | Iwabuchi | |
| 5,769,952 A | 6/1998 | Komino | |
| 5,934,646 A | 8/1999 | Tamura et al. | |
| 6,045,117 A | 4/2000 | Tamura et al. | |
| 6,056,266 A | 5/2000 | Blecha | |
| 6,082,706 A | 7/2000 | Irie | |
| 6,089,537 A | 7/2000 | Olmsted | |
| 6,095,180 A | 8/2000 | Ishigaki et al. | |
| 6,416,037 B1 | 7/2002 | Geiser | |
| 6,431,518 B1 | 8/2002 | Geiser | |
| 6,561,483 B2 | 5/2003 | Nakagawa | |
| 6,561,484 B2 | 5/2003 | Nakagawa et al. | |
| 6,629,682 B2 | 10/2003 | Duelli | |
| 6,902,145 B2 * | 6/2005 | Latzer et al. | 251/170 |
| 7,147,424 B2 * | 12/2006 | Weaver | 414/684.3 |
| 7,255,328 B2 * | 8/2007 | Hunter | 251/326 |

FOREIGN PATENT DOCUMENTS

| | | |
|---|---|---|
| GB | 257254 | 9/1926 |
| JP | 60222670 | 11/1985 |

* cited by examiner

*Primary Examiner* — John K Fristoe, Jr.
(74) *Attorney, Agent, or Firm* — Muncy, Geissler, Olds & Lowe, PLLC (57) ABSTRACT

A vacuum gate valve includes a closure disk for gas-tight closing of an opening. A connecting rod with which the closure disk is coupled is linearly adjustable by means of a linear drive unit and the closure disk is thus displaceable between a position uncovering the opening and an intermediate position pushed over the opening. At least two limbs are pivotably mounted at one limb end on the back of the closure disk via a first joint and at the other limb end on a support via a second joint to press the closure disk into the closed position. The limbs, the back and the support form an articulated parallelogram. Each of the limbs forms, with the respective first and second joints, a common integral part which includes a resilient material, the first joint and the second joint being formed by a flexible section on the limb.

16 Claims, 6 Drawing Sheets

VACUUM GATE VALVE HAVING A LIMB ELEMENT

BACKGROUND

The present invention relates to a vacuum gate valve comprising a closure disk for substantially gas-tight closing of an opening by displacement of the closure disk over the opening and pressing of the closure disk onto the opening by means of at least two limbs.

Different embodiments of vacuum valves for substantially gas-tight closing of a flow path which leads through an opening in a valve housing are disclosed in the prior art. Particularly in the area of IC and semiconductor manufacture, which must take place in a protected atmosphere as far as possible without the presence of contaminating particles, vacuum gate valves, also referred to as vacuum gates, are used. For example, in a production plant for semiconductor wafers or liquid crystal substrates, the highly sensitive semiconductor or liquid crystal elements pass sequentially through a plurality of process chambers in which the semiconductor elements present inside the process chamber are processed by means of in each case a processing apparatus. Both during the processing inside the process chamber and during the transport from process chamber to process chamber, the highly sensitive semiconductor elements must always be present in a protected atmosphere—in particular in an environment free of air. The process chambers are connected to one another, for example, via connecting corridors, it being possible for the process chambers to be opened by means of vacuum gate valves for transfer of the parts from one manufacturing chamber to the next and to be closed gas-tight after the respective manufacturing step has been carried out. Such vacuum gate valves are also referred to as vacuum transfer valves owing to the field of use described and the associated dimensioning and are also referred to as rectangular gates owing to their rectangular opening cross-section.

The prior art discloses various embodiments of vacuum valves, in particular the sealing and drive technology thereof. Depending on the respective drive technologies, a distinction is made in particular between vacuum gate valves or gate valves, also referred to as valve gates or rectangular gates, and shuttle valves, the closing and opening generally taking place in two steps.

In a first step, a valve closure, in particular a closure disk, is displaced linearly over an opening substantially parallel to the valve seat in the case of gate valve, as disclosed, for example, in U.S. Pat. No. 6,416,037 (Geiser) or U.S. Pat. No. 6,056,266 (Blecha), or is pivoted about an axis of rotation over the opening in the case of a shuttle valve, as disclosed, for example, in U.S. Pat. No. 6,089,537 (Olmsted), without contact between the closure disk and the valve seat of the valve housing taking place thereby. In a second step, the closure disk is pressed with its closure side onto the valve seat of the valve housing so that the opening is closed gas-tight. The sealing can be effected, for example, either via a gasket which is arranged on the closure side of the closure disk and pressed onto the valve seat running around the opening, or via a gasket on the valve seat, against which the closure side of the closure disk is pressed.

Different sealing devices are disclosed in the prior art, for example in U.S. Pat. No. 6,629,682 B2. A suitable material for gaskets is, for example, the resilient sealing material known by the trade name Viton®.

The closing movement of a gate valve which takes place in two steps can be achieved by means of different mechanisms. The valve closure mounted, for example, on two connecting rods is connected via the connecting rods to a drive mechanism which, by a substantially linear movement along the connecting rod axis, permits a displacement of the closure disk substantially parallel above the opening to be closed. By means of the same drive mechanism, it is possible, by pivoting of the connecting rods, to swivel the closure disk, which is now present in a position opposite the opening and a distance away and substantially parallel to the valve seat, in the direction of the valve seat and to press it substantially perpendicularly onto the valve seat. Instead of two connecting rods, it is also possible to use only one connecting rod. The use of a plurality of connecting rods is likewise possible.

The prior art discloses different types of such drive mechanisms, which in each case may result in a slightly different displacement path of the connecting rod and hence of the closure disk. Thus, for example, instead of swivelling of the closure disk along an arc on the valve seat, an absolutely linear movement of the closure disk perpendicular to the valve seat can be initiated. Drive mechanisms which permit both a substantially linear displacement of the closure disk above the opening and substantially perpendicular pressing of the closure disk onto the valve seat running around the opening are disclosed, for example, in U.S. Pat. No. 6,431,518 B1, U.S. Pat. No. 5,415,376 A, U.S. Pat. No. 5,641,149 A, U.S. Pat. No. 6,045,117 A, U.S. Pat. No. 5,934,646 A, U.S. Pat. No. 5,755,255 A, U.S. Pat. No. 6,082,706, U.S. Pat. No. 6,095,180 and U.S. Pat. No. 6,629,682 B2.

By means of the closing process taking place in two steps, it is intended that the gasket be subjected to scarcely any sheer forces which would destroy the gasket, since a substantially linear movement of the closure disk perpendicularly onto the valve seat takes place as a result of the swivelling of the connecting rods.

The two-stage movement sequence can, however, also be achieved by means of a plurality of separate drive mechanisms. For example, U.S. Pat. No. 6,056,266 (Blecha) and U.S. Pat. No. 6,561,484 (Nakagawa) describe gate valves whose connecting rods are linearly displaceable only along the connecting rod axis, with the result that the closure disk can be displaced parallel above the opening without having any contact between the closure disk and the valve seat. The drive mechanism can in this case be formed by a simple linear movement drive, for example a cylinder drive. The pressing of the closure disk onto the valve seat is achieved by a separate drive in the two-part closure disk or between the closure disk and the connecting rods. This separate drive is in particular in the form of a cylinder drive by means of which the closing side of the closure disk can be pressed linearly and perpendicularly onto the valve seat, as shown in U.S. Pat. No. 6,056,266 (Blecha).

U.S. Pat. No. 6,561,483 (Nakagawa) and U.S. Pat. No. 6,561,484 (Nakagawa et al.) disclose gate valves in different embodiments which comprise a two-part closure disk. A first disk section has an opening. A second disk section is connected by means of an extendable body to the first disk section. An actuator is arranged between the first and second disk section so that the two disk sections can be actively moved toward one another and away from one another. The extensible body is in the form of a bellows. The first disk section can be pressed against the valve seat by means of the actuator, the second disk section—in particular in the case of excess pressure on the valve seat side—optionally being supported on an opposite valve housing side. The design of such vacuum valves having drives in the closure disk is relatively complex especially because of the necessity of using a bellows or a plurality of sealing rings for sealing the first disk section to the second disk section and to the valve seat, is disadvantageous regard to maintenance and is susceptible to soiling.

A general disadvantage of said vacuum valves is in general the relatively complex design of the at least one drive mechanism which must permit the above-described two movements, which as far as possible are linear, in two directions substantially at right angles to one another.

U.S. Pat. No. 5,769,952 (Komino) discloses a gate valve which is in the form of a vacuum transfer valve and is composed substantially of a linear displacement drive, a connecting rod linearly displaceable along its connecting rod axis and a closure disk. The closure disk is connected via two limbs to the connecting rod. By displacement of the connecting rod linearly along the connecting rod axis in the closing direction, the closure disk can be displaced parallel above the valve opening, the closure disk being present opposite to and a distance away from the valve seat which surrounds the opening. The two limbs are each mounted at one limb end on a crossbar extending transversely to the connecting rod and running parallel to the plane of the valve seat and are each mounted at the other limb end in a pivotable manner on the closure disk by means of pivot bearings. Both limbs are arranged parallel to one another in the direction of the crossbar and have in each case a common geometrical axis of rotation with respect to the closure disk and with respect to the crossbar. The limbs hold the closure disk in such a way that the geometrical axis of rotation on the cross bar side is present below the axis of rotation on the closure part side with respect to the closing direction of the linear displacement direction of the connecting rod, so that a force acting on the closure disk against the closing direction of the connecting rod leads to a reduction of the distance between the two axes of rotation with respect to the closing direction. A guide roller is arranged at the end of the linear displacement path of the closure disk. If there is contact between the closure disk and the guide roller, the closure disk can no longer be displaced further in the closing direction. However, the linear displacement drive continues to exert a force on the closure disk so that the limbs can swivel out, thus approach the perpendicular position to the linear displacement direction and act as a lever. Thus, the closure disk is displaced in the direction of the valve seat and is pressed onto the latter.

An advantage of such a gate valve having a limb mechanism is the relatively simply designed drive, since the connecting rod need only be displaced linearly. However, the forces which act perpendicularly on the connecting rod axis and have to be absorbed by the connecting rod bearing present a problem. Since the closure disk is supported on the guide roller and must therefore absorb large forces, the closure disk must be designed with large dimensions. Owing to the arrangement of the axes of rotation, the parallel alignment of the closure disk with the valve seat is not ensured, and the closure disk therefore initially rests skew on contact with the valve seat, shear forces on the seal are unavoidable and a uniformly distributed contact force is not ensured. By using the guide roller and the pivot bearing, the generation of particles, in particular owing to friction, cannot be prevented, and freedom from particles is therefore not ensured.

JP 60222670 describes a vacuum gate valve in which a closure part is mounted on a linearly displaceable connecting rod by means of two limbs which are pivotable in the manner of a parallelogram and are parallel and a distance apart in the displacement direction of the connecting rod. Owing to the mounting in the manner of a parallelogram via the limbs, the closure part is always aligned parallel to the connecting rod and to the valve seat. When the closure part is swivelled out in the closing direction of the linearly displaceable connecting rod, the closure part is moved by linear displacement of the connecting rod parallel above the opening of the valve until the closure part touches a stopper mounted above the opening. The stopper prevents the closure part from further movement in the closing direction. However, since the connecting rod is further displaced in the closing direction, the limbs swivel out in the direction of the valve seat so that the closure part is pressed onto the valve seat and the opening is thus closed.

In the case of the valve described in JP 60222670, the limbs are mounted on the connecting rod and the closure part by means of bolts. The pivot mechanism described thus has a multiplicity of friction points at which abrasion particles are produced owing to a relative frictional movement. For this reason, such a pivot mechanism is substantially unsuitable for fields of use in which particle generation must be kept to a minimum.

U.S. Pat. No. 4,491,145 (Williams et al.), U.S. Pat. No. 5,415,375 (Gaboriault), U.S. Pat. No. 2,841,361 (Palmer) and GB 257, 254 also describe gate valves having such parallelogram-guided mechanically mounted limbs for pressing a valve closure onto a valve seat by the swivelling out of the limbs. Common to these embodiments is that, owing to their numerous friction points, in particular the bearings of the limbs, their operation is associated with relatively considerable particle production and use in the high-cleanliness vacuum sector in which the free particles are to be kept to a minimum is substantially ruled out.

The requirement for a vacuum valve of the type mentioned at the outset, in particular a vacuum transfer valve, which has a relatively simple drive and meets the general requirements, which are very high in vacuum technology and in particular in semiconductor production, for a vacuum valve, in particular with respect to as little particle generation as possible, could therefore not be met to date to the desired extent.

SUMMARY OF THE INVENTION

It is therefore an object of the invention to provide a vacuum gate valve, in particular a vacuum transfer valve, which is distinguished by a relatively simply designed drive, little particle generation, little wear, in particular of the seals, a high load capacity and good maintainability.

This object is achieved by realizing the features of the independent claim. Features which further develop the invention in an alternative or advantageous manner are evident from the dependent patent claims.

The vacuum gate valve according to the invention comprises a valve wall which has an opening and a valve seat running around the opening. The opening has, for example, a rectangular cross-section and is suitable in particular for transferring semiconductor elements. A round or other cross-section is also possible. A closure disk having a closing side serves for substantially gas-tight closing of the opening. The closure disk has a design such that it can completely overlap the opening and can be pressed onto the valve seat. In order to be able to produce a gas-tight connection between the valve seat and the closing side, a sealing element, in particular a O-ring seal, is provided on the closing side and/or the valve seat. Valve seat is to be understood generally as meaning that surface on which the closure disk comes to rest on closing of the opening for sealing.

At least one connecting rod is mechanically coupled at least indirectly to the closure disk and connects the closure disk to a linear drive unit. In order to permit better stability of the closure disk, in particular two connecting rods are provided. The connecting rod is displaceable by means of the linear drive unit along its connecting rod axis substantially linearly, in other words in a straight line or translationally. The linear drive unit can be formed by any desired linear drive which can effect a translational movement of the connecting rod or of the plurality of connecting rods. Such a linear drive can be formed by at least one pneumatic drive, one mechanical drive, such as a threaded spindle drive, one ball screw, one pantograph drive, one electromechanical linear drive, one hydraulic cylinder or one other suitable drive. Such drives for valves are disclosed in the prior art. The two directions in which the linear drive movement can displace the connecting rod along the connecting rod axis are summarized below as the displacement direction or the two displacement directions. A linear or straight-line displacement is also to be understood as meaning a slightly arc-shaped movement to be regarded only substantially as being straight.

The closure disk mechanically coupled—at least indirectly—to the connecting rod, in particular to its free end which is opposite the linear drive unit is thus linearly displaceable by the linear drive unit. The linear drive unit, the connecting rod and the closure disk are thereby formed and coupled with one another in such a way that the closure disk is displaceable between a position uncovering the opening and an intermediate position in which it is moved above the opening, substantially parallel to the valve seat or parallel to the opening. In this intermediate position, the closing side is present at least partly in a position opposite to the valve seat or to the opening, substantially parallel and a distance away. Depending on the design of the vacuum gate valve, the closing side is present in the intermediate position in a position opposite to the valve seat, exactly parallel and overlapping the opening centrally, so that a perpendicular movement of the closure disk onto the valve seat would lead to gas-tight closing, or the closing side is present laterally offset in an only partly overlapping position opposite to the valve seat so that a non-perpendicular but oblique movement or a pivot movement is required for gas-tight closing of the opening by central and oriented placement of the closing side on the valve seat.

That substantially linear displacement direction of the connecting rod and hence also of the closure disk, in which the closure disk is brought from the position uncovering the opening into the intermediate position, is referred to as the closing direction.

At least two limbs extend on the back of the closure disk, which is that side of the closure disk which is opposite the closing side, i.e. is on the other side. The at least two limbs are pivotable in the two displacement directions of the connecting rod. This means that the axis about which the limbs are pivotable is not parallel to the displacement direction, i.e. not parallel to the connecting rod axis. Preferably, this axis of rotation is perpendicular to the displacement direction and parallel to the plane of the valve seat and to the plane of the opening.

The at least two limbs are pivotably coupled to one another in the manner of a parallelogram and are parallel and a distance apart in the displacement direction of the connecting rod. One limb end of each of the at least two limbs is pivotably mounted on the back of the closure disk via a first joint in each case, whereas the respective other limb end is pivotably mounted on the support via a second joint in each case. The at least two limbs, the back of the closure disk and the support form a parallelogram which is articulated by the at least two first joints and the at least two second joints. The closure disk and the support are hereby pivotable parallel to one another and a distance apart in the two displacement directions of the connecting rod.

In other words, the at least two parallel limbs are mounted in such a way that they can be pivoted in the manner of a parallelogram, the geometrical, articulated parallelogram being defined by four bearing points in the case of two limbs. Two of these four bearing points, the two first joints, are coordinated hereby with the closure disk and the other two bearing points, the second joints, are coordinated with a connection between the two limbs which is opposite the closure disk. The different possibilities for creating this connection opposite the closure disk in the form of a support are described below in particular with reference to specific working examples.

According to the invention, each of the limbs with the respective first joint and the respective second joint forms a common integral part which consists of a resilient material. Each of the at least two limbs thus has a direct transition to a joint in each case at its two limb ends. The joints and the limb are a part of a common material. The joints are formed by a thin-walled flexible section at one end and the other end of the limb. The limb therefore consists of a less resilient section which is designated as the actual limb and extends between the back and the support and connects these, and two sections which tend to be resilient and bendable about in each case an axis of rotation and which form the first joint and the second joint. The thin-walled character and flexibility achieved thereby in the region of the joints can be produced by means of a corresponding casting mold during the original shaping of the limb, or by corresponding, for example non-cutting finishing or final machining. The respective first joint and the respective second joint can be in the form of living hinges, the thin-walled, flexible section being formed in each case by a fold. Such one-part living hinges are known in particular from packaging technology, for example in the case of flap closures of polypropylene packs. Such hinges substantially comprise a thin-walled joint, often in the form of a fold, which, by its flexibility, permits a certain rotational movement of the connected parts. A material very suitable for this purpose is the polypropylene belonging to the subgroup of the polymers, owing to its excellent resistance to wear. Other plastics, in general thermoplastics or thermosetting plastics, which are distinguished by corresponding material properties can likewise be used. Further possible materials are, for example, silicon or metal materials, such as aluminum and steel materials and suitable alloys, which are distinguished by sufficiently great resilience for use as flexible hinges.

The flexibility of the material which is desired in the region of the joint but tends to be undesired in the region located in between can be provided by a correspondingly relatively thin-walled design in the joint region. However, it is also possible to achieve the different flexibility by a material treatment, in particular different thermal material treatment. Furthermore, it is possible to achieve the flexibility in the limb region between the joints via an additional element, for example a sheath, a sleeve or a coating.

As a result of the integral formation of the limb and the joints, i.e. the hinges, friction between different parts and associated formation of abrasion particles are avoided. The vacuum gate valve according to the invention is therefore distinguished by extremely little particle generation and, for this reason, is very suitable for highly sensitive applications in which very high cleanliness is required.

Furthermore, the gate valve comprises an engagement element which is kinematically coordinated with the valve wall or the linear drive unit or is coupled thereto. The engagement element is ordered and formed in such a way that it prevents a section of the geometrical articulated parallelogram, in the closing direction of the connecting rod, after reaching the intermediate position, from further displacement in the closing direction of the connecting rod. As described above, the geometrical articulated parallelogram, at least formed by the at least two limbs including the first joints and second joints, the back of the closure disk and the support, is thus the elements kinematically coupled in each case for this purpose. Preferably, the engagement element, which may be formed by a mechanical stopper, prevents either the closure disk, if the linear drive is coupled to the support, or the support, if the linear drive is coupled to the closure disk, from further movement in the closing direction.

The section not blocked by the engagement element is that on which the connecting rod is arranged. Depending on the embodiment, it is possible for the connecting rod either to be arranged on the side of the closure disk so that the closure disk is displaced directly by the connecting rod or for the limbs to be present kinematically between the connecting rod and the closure disk, the connecting rod in this case being coupled to the support. The engagement element therefore blocks a section of the limb element either on the side of the closure disk or on the side of the support opposite the closure disk.

In other words, depending on the arrangement of the connecting rod, which is mounted directly or indirectly either on the side of the closure disk or on the side of the support, this other section prevented by the engagement element from further displacement in the closing direction is formed by the support or the closure disk. Relative to the non-blocked section, which is coordinated with the connecting rod, the other section of the limb arrangement is swivelled in the closing direction. The geometrical parallelogram is therefore not rectangular but extends in the closing direction with respect to the non-blocked section on which the connecting rod is arranged.

Thus, on further displacement of the connecting rod which takes place in the closing direction, the limb element is swivelled out in such a way, by virtue of the fact that the geometrical parallelogram approaches the rectangular state, that the closure disk is pressed with its closing side onto the valve seat in the closed position of the gate valve and the opening is closed gas-tight. In other words, the distance between that section of the limb arrangement which is arranged on the connecting rod and the section prevented from further movement to the connecting rod taking place in the closing direction by the engagement element, in the direction perpendicular to the plane of the valve seat or to the plane of the opening is increased so that the closure disk is pressed toward the valve seat. That section of the limb arrangement which faces away from the valve seat is thereby supported in the direction perpendicular to the plane of the valve seat or to the plane of the opening. Thus, the contact force on the valve seat is produced by a lever action caused by the linear movement of the connecting rod in the closing direction.

Of course, it is possible within the scope of the invention also to use a plurality of limbs, in particular three, four, five, six or even more limbs, instead of two limbs arranged parallel to one another.

In one embodiment of the invention, the at least two limbs, the first joints, the second joints, a first limb connecting part which connects the first joints and is arranged on the back of the closure disk and a second limb connecting part which connects the second joints and is arranged on the support parallel to the first limb connecting part or forms the support are in the form of an integral limb element which consists of the resilient material. In this embodiment, the geometrical parallelogram is formed by the constantly parallel outer limbs, the first limb connecting part and the second limb connecting part always parallel thereto. Between the outer parallel limbs which are furthest away, any desired number of further limbs which are always parallel to one another may be present between the first and second limb connecting part, with the result that the stability of the limb element and the maximum achievable contact force of the closure disk on the valve seat can be considerably increased. At their limb ends, in a thin-walled section which forms the joints, the limbs have an integral transition to the first and second limb connecting part.

In particular, a plurality of limb elements are provided side by side. In a further development of the embodiment, the second limb connecting part is formed by the support instead of being connected to it.

The integral limb element preferably consists of plastic, in particular a suitable polymer, such as polypropylene, of silicon or of a metal material, in particular an aluminum material or steel material, and of another alloy.

An advantage of the parallel arrangement of the at least two limbs is that the closing side of the valve disk is aligned parallel to the valve seat on initial contact and is pressed parallel onto the valve seat. The wear of the seal arranged between the valve seat and the closing side is thus considerably reduced and the process reliability is increased. Since there is no need for relative movement between the engagement element and the limb element, particle generation is considerably reduced. This is of very great importance especially in the area of semiconductor production. By using at least two limbs, a very great contact pressure of the closure disk on the valve seat can be achieved in spite of the use of only one linear drive unit.

Since it possible according to the invention to form the limb element integrally, friction can almost completely be avoided, with the result that scarcely any abrasion particles form and hence particle generation can be further reduced. In particular owing to the linear drive, the gate valve according to the invention is furthermore distinguished by a relatively simple design and good maintainability.

BRIEF DESCRIPTION OF THE DRAWINGS

The vacuum gate valve according to the invention is described in more detail below, purely by way of example, with reference to specific working examples shown schematically in the drawings, further advantages of the invention also being discussed. Specifically.

DETAILED DESCRIPTION

Figure 3:
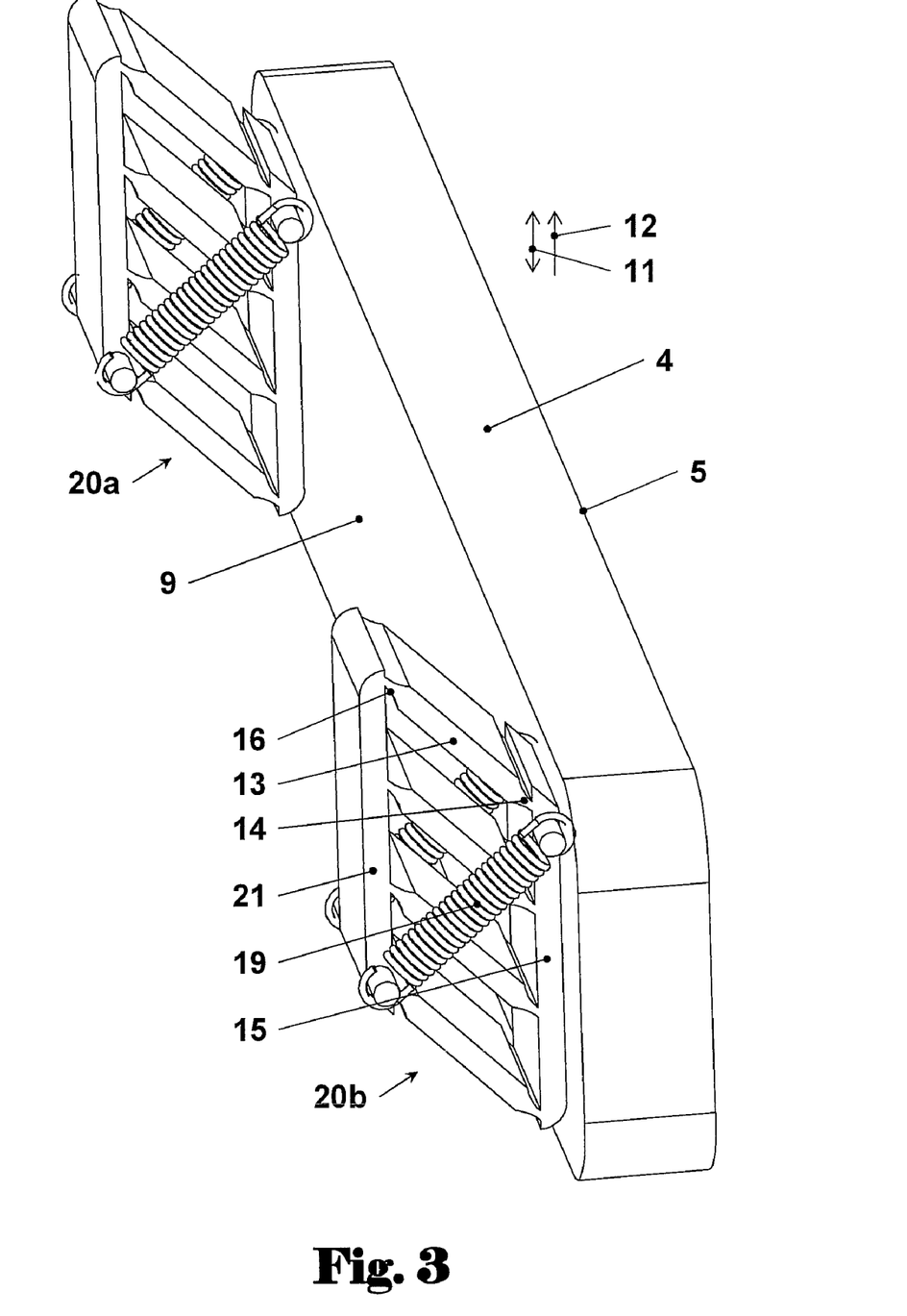
FIG. 3 shows an oblique view of a closure disk having two limb elements.
Figure 4:
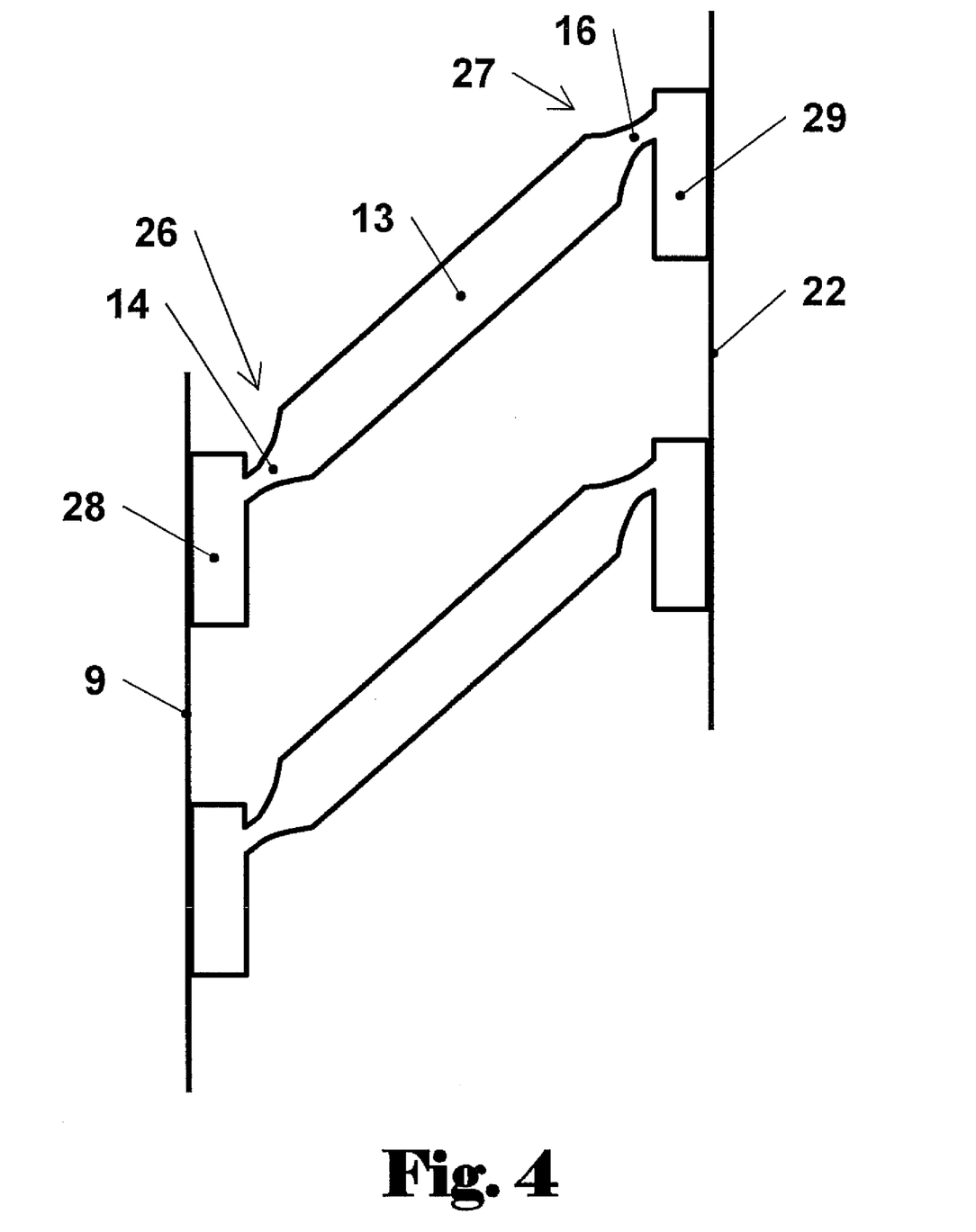
FIG. 4 shows a detailed side view of the limbs of the first and second embodiments.

FIGS. 1a, 1b and 1c and FIGS. 2a, 2b and 2c show in each case the same gate valve with different positions of the closure disk, and it is for this reason that the respective three figures are described jointly and repeated mention of reference numerals is dispensed with in some cases both in the figures and in the description. While FIGS. 1a to 2c show greatly simplified schematic diagrams, somewhat more detailed schematic oblique or side views of the limb elements or the limbs are shown in FIGS. 3 and 4. FIGS. 3 and 4 are therefore also described in some cases jointly with FIGS. 1a to 2c.

Figure 1A:
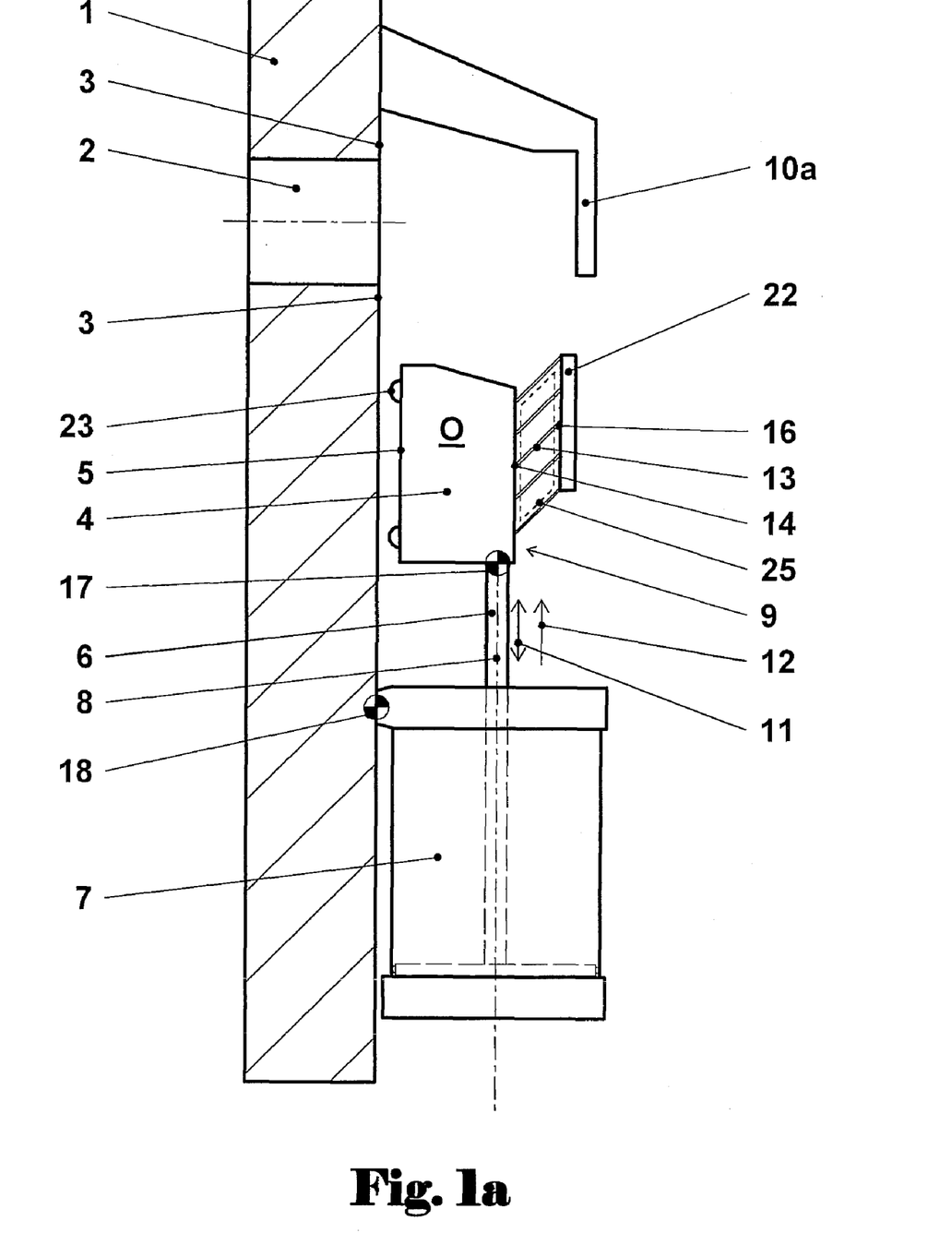
FIG. 1a shows a side view of a first embodiment of the vacuum gate valve comprising a closure disk mounted on the connecting rod, in the opened position.

FIG. 1a shows a first possible embodiment of the vacuum gate valve in the form of a transfer valve. The gate valve has a valve wall 1 which has a substantially rectangular opening 2 typical for a transfer valve and a valve seat 3 running around the opening 2. Furthermore, a closure disk 4 having a closing side 5 for substantially gas-tight closing of the opening 2 is provided. A seal 23, in particular a seal vulcanized on the closing side, is provided on the closing side 5 which faces the opening 2, parallel to the plane of the valve seat 3, which seal is arranged on the closing side 5 of the closure disk 4 in such a way that it can come to rest on the valve seat 3 and can be brought into gas-tight contact therewith.

Figure 1B:
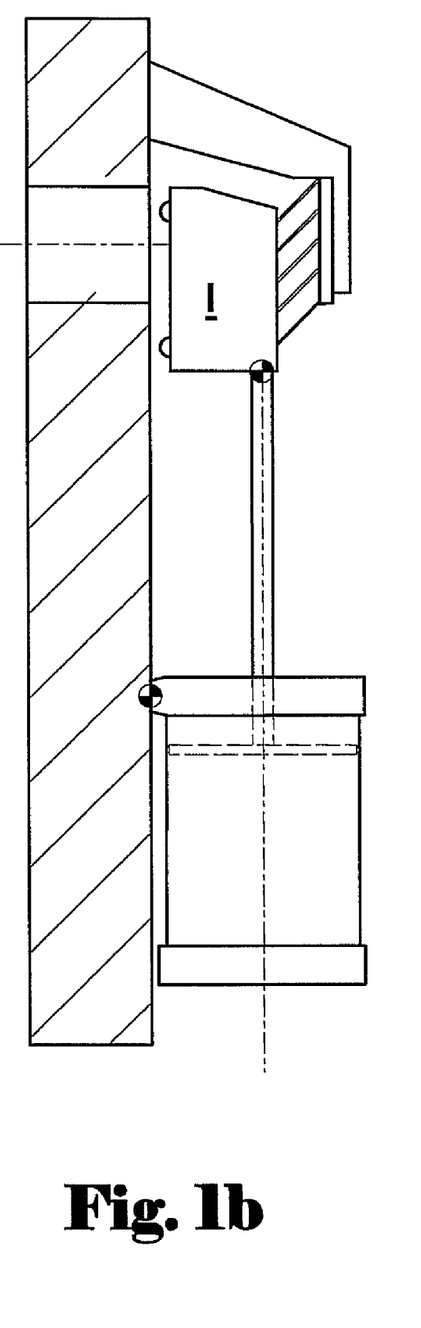
FIG. 1b shows the first embodiment comprising the closure disk in the intermediate position.
Figure 1C:
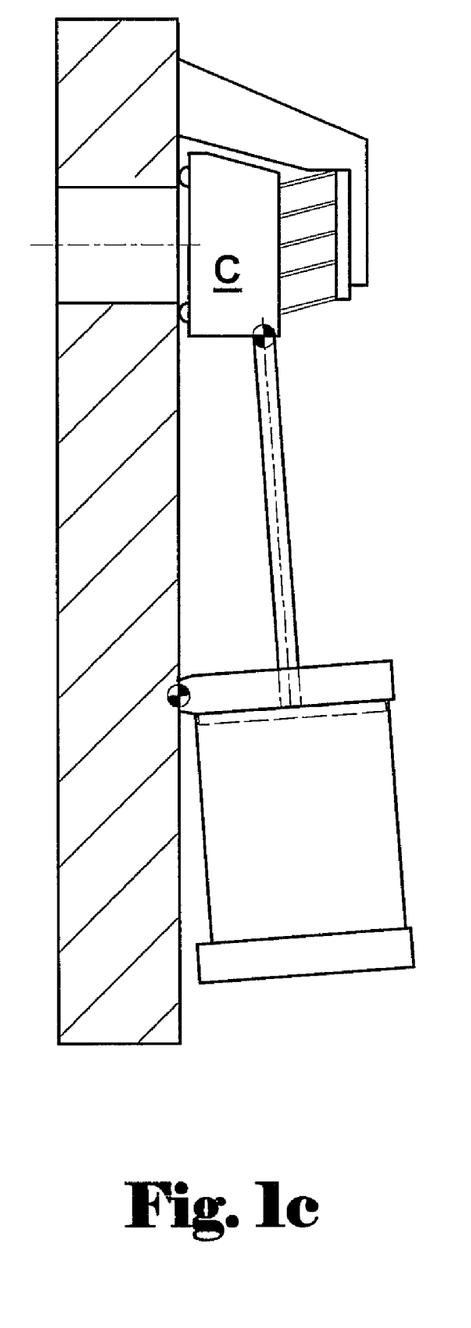
FIG. 1c shows the first embodiment comprising the closure disk in the closed position.

The closure disk 4 is mounted so as to be pivotable about an axis 17 of rotation of the closure disk on two parallel connecting rods 6 and thus mechanically coupled therewith. Since the connecting rods 6 in the side view of FIGS. 1a to 1c are flush, only one of the two connecting rods 6 can be seen. The longitudinal central axis of the straight connecting rods 6 is designated as connecting rod axis 8. The axis 17 of rotation of the closure disk is perpendicular to the connecting rod axis 8 and parallel to the plane of the valve seat 3 and hence to the plane of the opening. The pivotability is permitted, for example, by a hinge-like joint and is limited so that the closing side 5 can deviate only by a few degrees from its parallel orientation relative to the valve seat 3. The pivotability is possible in a relatively large range but a spring mechanism keeps the closure disk 4 substantially parallel to the valve seat 3.

The connecting rod 6 is connected to a linear drive unit 7, for example a pneumatic cylinder, by means of which the connecting rod 6 is displaceable in a straight line, i.e. linearly, or in other words transitionally, back and forth in the two displacement directions 11 along its connecting rod axis 8. In this working example, the displacement direction 11 is parallel to the connecting rod axis 8. Alternatively, it is possible for the connecting rods 6 to be connected obliquely to the closure disk 4. In this case, the displacement direction 11 is no longer along the true connecting rod axis 8. The connecting rod axis 8 is therefore defined as the geometric axis of the linear displaceability of the closure disk 4. By means of the linear drive unit 7, the closure disk 4 can thus be displaced between a position O which completely uncovers the opening 2 and in which the closure disk 4 is present at the side of the opening 2 and does not project into said opening, as shown in FIG. 1a, and an intermediate position I in which said disk is moved over the opening and in which the closing side 5 is present at least partly in a position opposite the valve seat 3 and parallel and a distance away, as illustrated in FIG. 1b. The displacement takes place substantially parallel to the valve seat 3. The linear drive unit 7, including the connecting rod 6, is mounted so as to be pivotable about an axis 18 of rotation of the linear drive, which axis is perpendicular to the connecting rod axis 8, parallel to the plane of the valve seat 3 and also parallel to the axis 17 of rotation of the closure disk, the linear drive unit 17 in the starting state being oriented, in particular by means of springs which are not shown and/or via gravitational force, in such a way that the displacement direction 12 is substantially parallel to the plane of the valve seat 3.

Two limb arrangements which in each case comprise five limbs 13 are arranged side by side on the back 9 of the closure disk 4, which back 9 is opposite the closing side 5. Since the two limb arrangements are flush in the side view of FIGS. 1a to 1c, only one of the two limb arrangements can be seen. A detail of the limb arrangement which shows two limbs 13 is illustrated in detail in FIG. 4. The limb arrangement extends on the back 9 and has five parallel limbs 13 which are pivotably coupled to one another in the manner of a parallelogram and are parallel and a distance apart in the displacement direction 11 of the connecting rod 6. In the greatly simplified diagram of FIGS. 1a to 1c, five limbs 13 are shown schematically and simplified. Instead of five limbs 13, it is also possible for two, three, four, six or any number of further parallel limbs 13 to be present. The limbs 13 are pivotable in the displacement direction 11 of the connecting rod 6.

The limbs 13 are pivotably mounted at one limb end 26 on the back 9 of the closure disk 4 via in each case a first joint 14 and at the other limb end 27 on a support 22 via a second joint 16, as shown in FIG. 1a and FIG. 4. Any desired limbs 13, the back 9 of the closure disk 5 and the support 22 form a parallelogram 25, articulated by the respective first joints 14 and the respective second joints 16, as shown in FIG. 1a, so that the support 22 is pivotable relative to the closure disk 5 in the two displacement directions 11 of the connecting rod 6, the support 22 being parallel to the closure disk 5 and a distance away therefrom.

As can be seen in FIG. 4, each limb 13 consists of a section which extends between the back 9 and the support 22 and forms the actual limb 13, a first joint 14 formed at one limb end 26, a second joint 16 formed at the other limb end 27, a first limb fixing section 28 which is adjacent to the outside of the first joint 14 and is fixed to the back 9 and a second limb fixing section 29 which is adjacent to the outside of the second joint 16 and is fixed to the support 22.

According to the invention, the limb 13 with the first joint 14, the second joint 16, the first limb fixing section 28 and the second limb fixing section 29 forms a common integral part which consists of a resilient material. As can be seen in FIG. 4, the first joint 14 and the second joint 16 are in each case a thin-walled, flexible section on the limb 13. Specifically, the joints 14 and 16 are in the form of living hinges, the thin-walled, flexible section being formed in each case by a fold.

The resilient material may be any desired plastic having suitable material properties, in particular polypropylene, metal material, silicon or other material.

The limb fixing sections 28 and 29 are mounted, for example, by means of screws or adhesive bonding on the back 9 and on the support 22, respectively.

An engagement element 10a which projects beyond the range of movement of the closure disk 4 and is opposite the opening 2 and the valve seat 3 is arranged on the valve wall 1, the closure disk 4 being present in intermediate position I as shown in FIG. 1b, with its limbs 13 and support 22 between the engagement element 10a and the valve seat 3. The engagement element 10a is ordered and formed in such a way that the support 22 swivelled in the closing direction 12 is prevented, in the closing direction 12 of the connecting rod 6, after reaching the intermediate position I, as shown in FIG. 1b, from further displacement in the closing direction 12. With the further displacement of the connecting rod 6 in the closing direction 12, the limbs 13 are swivelled out so that the closure disk 4 is pressed with its closing side 5 onto the valve seat 3 in the closed position C and the opening is closed gas-tight, as shown in FIG. 1c. The support 22 is supported on the engagement element 10a in the direction perpendicular to the valve seat 3. Owing to the parallelogram arrangement of the limbs 15, the parallel orientation of the closing side 5 relative to the valve seat 3 is always maintained so that the seal 23 is protected and an optimum gas-tight seal is ensured. During the swivelling of the limbs 13 and the reduction of the distance between the closing side 5 and the valve seat 3, swivelling also occurs between the connecting rods 6 and the closure disk 4 about the axis 17 of rotation of the closure disk and between the valve wall 1 and the linear drive unit 7 about the axis 18 of rotation of the linear drive, so that the displacement of the closure disk 4 in the direction of the valve seat 3 is not hindered on the part of the drive.

According to the invention, it is moreover possible in a preferred embodiment to use integral limb elements 20a and 20b, as described in more detail below in association with FIG. 3, instead of the multi-part limb arrangement having in each case five separate limbs 13.

FIG. 3 shows the design of the respective integral limb elements 20a and 20b. The limb element 20a or 20b is formed integrally from one material, in particular plastic, and is composed of four parallel limbs 13, a first limb connecting part 15, a second limb connecting part 21, the first joints 14 and the second joints 16. In the example shown, the first limb connecting part 15 and the second limb connecting part 21 are formed in each case from a plastic sheet which connects the first joints 14 to one another and the second joints 16 to one another. The first limb connecting part 15 is arranged on the back 9 of the closure disk 4, parallel to the second limb connecting part 21. In the assembled state not shown in FIG. 3 but recognizable from FIG. 1a, the second limb connecting part 21 is mounted on the support 22.

The limbs 13 are pivotably mounted in a parallelogram-like manner at one limb end on the first limb connecting part 15 in the first joints 14 and at the other limb end on the second limb connecting part 21 in the second joints 16. The first limb connecting part 15 and the second limb connecting part 21, together with two arbitrary limbs 13, together form the geometrical parallelogram 25, as shown in FIG. 1a. The joints 14 and 16 are flexible, integral plastic hinges, for example integral living hinges. Thus, it is possible for one limb element 20a or 20b to consist in each case of a single plastic part so that friction between bodies and hence particle generation are minimized. In the working example, the axes of the joints 14 and 16 are parallel to the plane of the valve seat 3, to the closing side 5, to the axis 17 of rotation of the closure disk and to the axis 18 of the linear drive and perpendicular to the connecting rod axis 8 and to the displacement direction 11.

A spring mechanism 19 is arranged on the limb element 20a and 20b in such a way that the second limb connecting part 12 is held so as to be pivotable in the closing direction 12 relative to the closure disk 4 and relative to the first limb connecting part 15, as shown in FIG. 3—and analogously also in FIG. 1a. The limbs 13 thus point in the closing direction 12 in their starting position, when viewed from the closure disk 4.

The support 22 may consist of a sheet which connects the second limb connecting parts 21 of the limb elements 20a and 20b (in the embodiment of FIG. 3) or the second limb fixing sections 29 of the limb arrangements (in the embodiment of FIG. 4). This sheet is arranged in particular parallel to the closure disk 4 and has, for example, substantially the dimensions thereof. Alternatively, the support 22 is, however, formed by the second limb connecting part 21. In this case, the support 22 performs the function of the second limb connecting parts 21, and vice versa.

In this case, the second limb connecting part 21 engages the engagement element 10a directly from the intermediate position I and is prevented from further movement in the closing direction 12 by said engagement element.

Figure 2A:
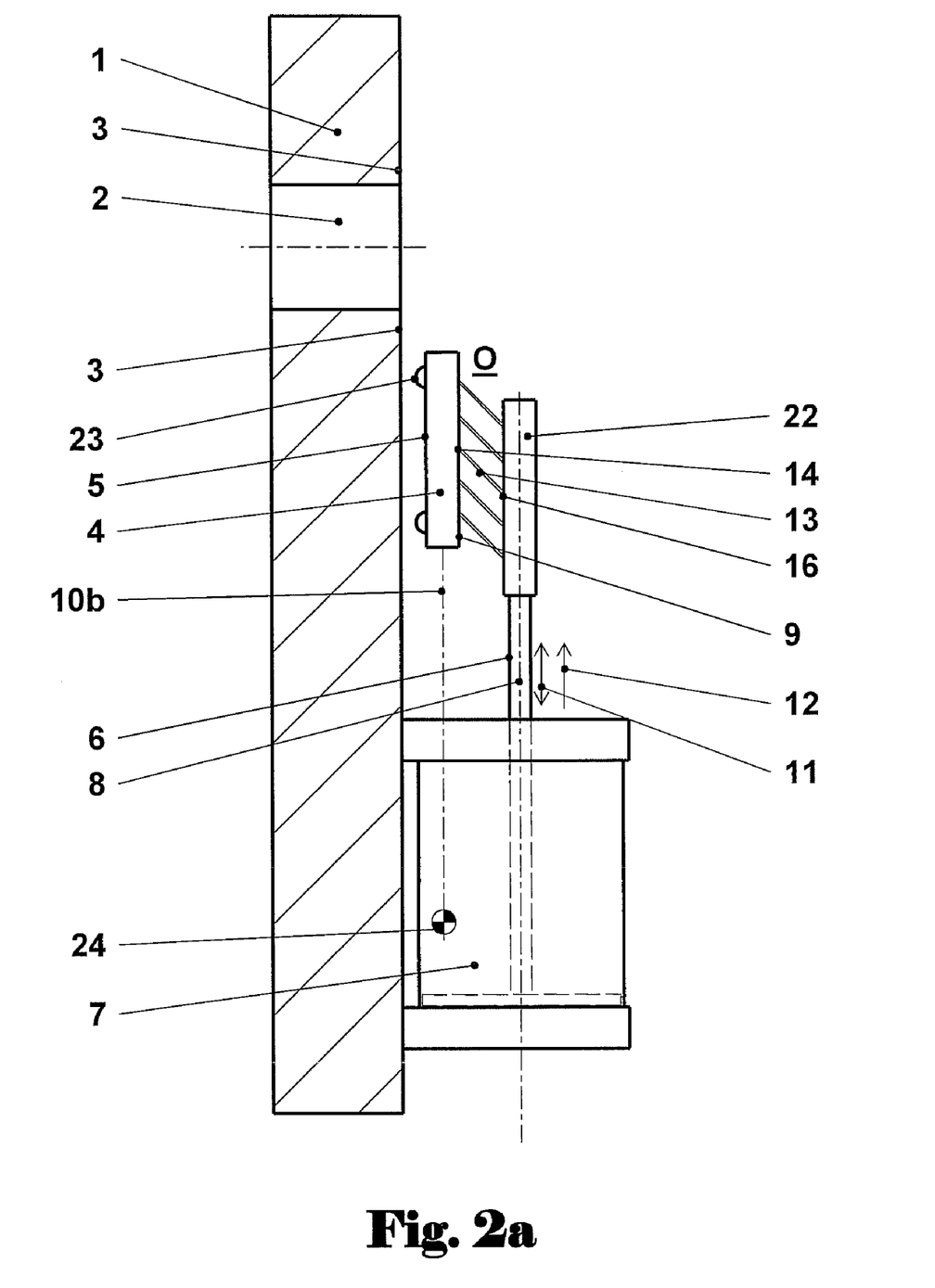
FIG. 2a shows a second embodiment comprising limbs mounted between the connecting rod and the closure disk, in the opened position.
Figure 2B:
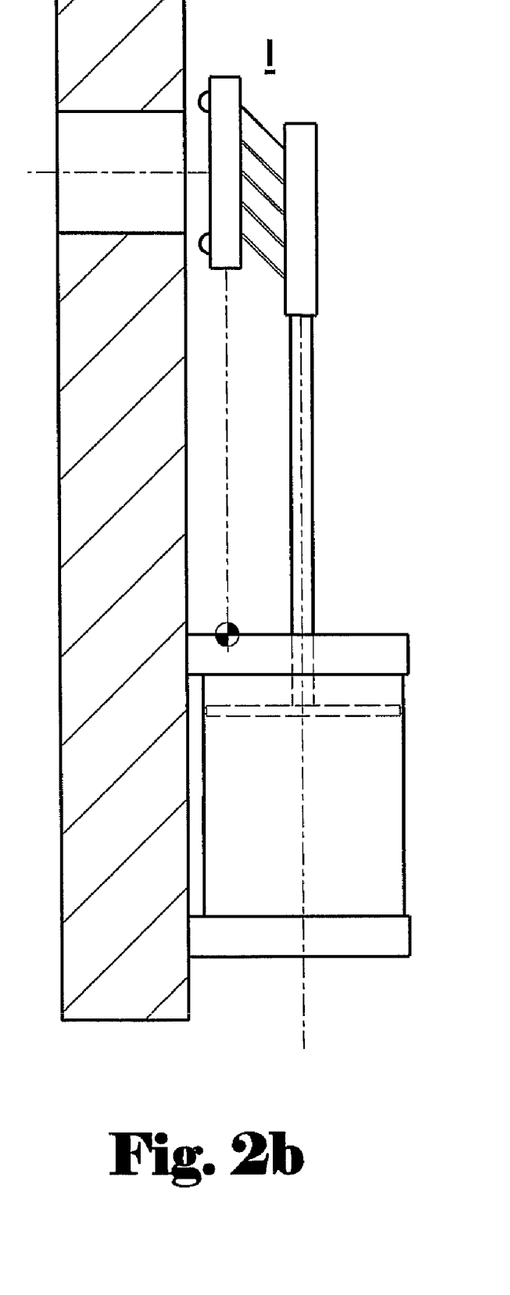
FIG. 2b shows the second embodiment comprising the closure disk in the intermediate position.
Figure 2C:
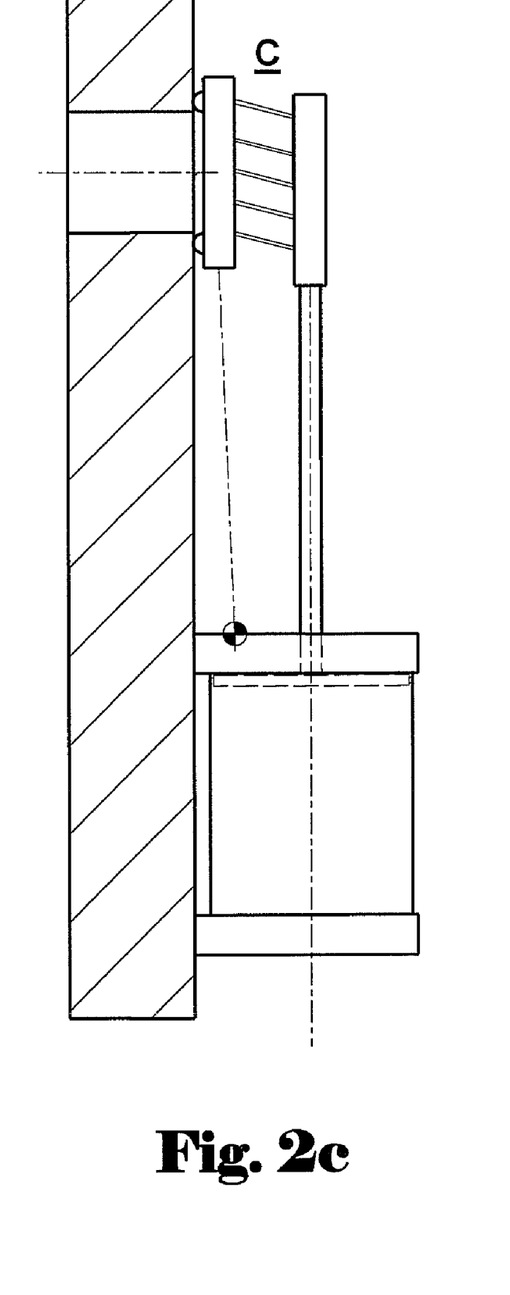
FIG. 2c shows the second embodiment comprising the closure disk in the closed position.

In FIGS. 2a to 2c, a second embodiment of the invention is shown, only the substantial differences between the first and the second embodiments being discussed below and the description of already explained elements and reference numerals being dispensed with in part.

In contrast to the first working example, the limbs 13 are arranged kinematically between the connecting rods 6 and the closure disk 4 in the case of the gate valve of FIGS. 2a to 2c.

The engagement element 10b therefore engages the closure disk 4. The limbs 13 are mounted at the one limb ends on the back 9 of the closure disk 4 in first joints 14 and at the other limb ends on the connecting rod 6 in second joints 16, pivotably in the manner of a parallelogram.

It is possible to use both the limbs according to FIG. 4 and the limb elements 20a and 20b according to FIG. 3, the first limb connecting part 15 being mounted on the back 9 of the closure disk 4—parallel to the second limb connecting part 21 which is connected to the support 22. The spring mechanism 19 is arranged on the limb element 20a or 20b in such a way that the closure disk 4 and the first limb connecting part 15 are held so as to be pivotable in the closing direction 12 relative to the connecting rod 6 and to the second limb connecting part 21. Instead of another arrangement of the springs, it is also possible to arrange the limb elements 20a and 20b so as to be rotatable through 180 degrees about a perpendicular axis to the closing side 5 so that the limbs 13 point in the opposite direction to that shown in FIG. 3.

A support 22 on which the limbs 13 are pivotably mounted on the connecting rod 6 in a parallelogram-like manner with the other limb end in the second joints 16 is arranged on the connecting rod 6 parallel to the closure disk 4. This support 22 may have the form of a sheet whose cross-section corresponds to the closure disk 4. Where the integral limb elements 20a and 20b are used, the second limb connecting part 21 is mounted on the support.

The engagement element 10b is arranged and formed in such a way that, after reaching the intermediate position I, the closure disk 4 swivelled in the closing direction 12 relative to the connecting rod 6, as shown in FIG. 2b, is prevented from further displacement in the closing direction 12, so that the closure disk 4 is pressed onto the valve seat 3 in the closed position C on further displacement of the connecting rod 6 in the closing direction 12, as shown in FIG. 2c. The limb arrangement with the limbs 13 or the limb elements 20a and 20b is supported here on the connecting rod 6 in the direction perpendicular to the valve seat 3. In the embodiment of the invention which is shown, the connecting rod 6 and the linear drive unit 7 are not pivotable and are dimensioned so that a force acting perpendicular to the connecting rod axis 8 can be absorbed.

The engagement element 10b may be in the form of at least one simple cable or a chain and extends kinematically between the closure disk 4 and the linear drive unit 7. By means of the engagement element 10b, the maximum distance between the closure disk 4 and the linear drive unit 7 when the closing side 5 and the valve seat 3 are opposite one another in the intermediate position I is limited so that the limbs 13 are caused to swivel out.

The maximum distance between the closure disk 4 and the linear drive unit 7 which is permitted by the engagement element 10b is illustrated schematically in FIGS. 2a to 2c by the stop point 24.

An advantage of such a flexible engagement element 10b, such as a cable, in particular a steel cable, or a chain, is the low level of particle generation and the very simple design.

It is possible to arrange the engagement element 10b above the closure disk 4 in the closing direction 12, for example in the form of a roller mechanism or a stopper which extends perpendicularly to the valve wall 1 above the opening 2.

This second embodiment has in particular the advantage that, after reaching the intermediate position, FIG. 2b, the closure disk 4 no longer executes any lateral movement relative to the valve seat 3 and is therefore pressed parallel in the form of an exactly perpendicular movement onto the valve seat. The wear of the seal 23 and the particle generation are thus kept low.

The specific working examples explained serve only for exemplary illustration of the invention with reference to systematic diagrams. Of course, the invention is not limited to these working examples. Individual features of the working examples can be combined with those of others.

The invention claimed is:

1. A vacuum gate valve comprising
a valve wall which has an opening and a valve seat running around the opening;
a closure disk having a closing side for substantially gas-tight closing of the opening;
at least one connecting rod which is mechanically coupled to the closure disk,
wherein the connecting rod can be displaced linearly along its connecting rod axis in the two displacement directions and hence the closure disk is displaceable substantially parallel to the valve seat between;
a position uncovering the opening; and
an intermediate position in which said disk is pushed over the opening and in which the closing side is present at least partly in a position opposite the valve seat, substantially parallel and a distance away,
at least two limbs which are parallel and a distance apart in the displacement direction of the connecting rod,
each of the limbs in each case
being pivotably mounted at one limb end on the back of the closure disk which is opposite the closing side, via a first joint, and
being pivotably mounted at the other limb end on a support via a second joint,
the at least two limbs, the back of the closure disk and the support forming a parallelogram which is articulated by the first joints and second joints so that the closure disk and the support are pivotable in the two displacement directions of the connecting rod, parallel and a distance apart,
each of the limbs, with the respective first joint and the respective second joint, forming a common integral part which comprises a resilient material, the first joint and the second joint being formed in each case from a thin-walled, flexible section on the limb, and
an engagement element which is ordered and formed in such a way that a section of the articulated parallelogram is prevented from further displacement in the closing direction of the connecting rod in the closing direction of the connecting rod after reaching the intermediate position, the limbs swivelling out on further displacement of the connecting rod in the closing direction so that the closure disk is pressed with its closing side onto the valve seat in the closed position and the opening is closed gas-tight.

2. The vacuum gate valve as claimed in claim 1, wherein the first joints and second joints are in the form of living hinges, the thin-walled, flexible section being formed in each case by a fold.

3. The vacuum gate valve as claimed in claim 1, wherein
the at least two limbs,
the first joints,
the second joints,
a first limb connecting part which connects the first joints and is arranged on the back of the closure disk and
a second limb connecting part which connects the second joints and is arranged on the support parallel to the first limb connecting part or forms the support are in the form of an integral limb element which consists of a resilient material.

4. The vacuum gate valve as claimed in claim 3, wherein a plurality of limb elements are provided side by side.

5. The vacuum gate valve as claimed in claim 3, wherein the second limb connecting part forms the support.

6. The vacuum gate valve as claimed in claim 1, wherein the limbs, with the respective first joint and second joint, includes a plastic of the following groups or subgroups:
thermoplastics,
thermosetting plastics,
polymers or
polypropylene.

7. The vacuum gate valve as claimed in claim 1, wherein the limb, with the respective first joint and second joint, consists of silicon or a metal material of the following group:
aluminum, or
steel materials.

8. The vacuum gate valve as claimed in claim 1, wherein the closure disk is arranged on the connecting rod and the engagement element is formed for preventing the support, swivelled relative to the closure disk in the closing direction, from further displacement in the closing direction after reaching the intermediate position, so that the closure disk is pressed onto the valve seat into the closed position on further displacement of the connecting rod in the closing direction.

9. The vacuum gate valve as claimed in claim 8, wherein the engagement element is coupled to the valve wall and is opposite the valve seat and a distance away.

10. The vacuum gate valve as claimed in claim 8, wherein the closure disk is mounted on the connecting rod so as to be pivotable about an axis of rotation of the closure disk which is perpendicular to the connecting rod axis.

11. The vacuum gate valve as claimed in claim 8, wherein the linear drive, including the connecting rod, is mounted so as to be pivotable about an axis of rotation of the linear drive which is perpendicular to the connecting rod axis.

12. The vacuum gate valve as claimed in claim 8, comprising a spring mechanism which is arranged so that the support is held so as to be pivotable in the closing direction relative to the closure disk.

13. The vacuum gate valve as claimed in claim 1, wherein
the support is arranged on the connecting rod and
the engagement element is formed for preventing the closure disk, swivelled relative to the support in the closing direction, from further displacement in the closing direction after reaching the intermediate position,
so that the closure disk is pressed onto the valve seat into the closed position on further displacement of the connecting rod in the closing direction.

14. The vacuum gate valve as claimed in claim 13, wherein the engagement element) is in the form of a cable or a chain, and extends between the closure disk and the linear drive unit and limits the maximum distance between the closure disk and the linear drive unit when the closing side and the valve seat are opposite one another.

15. The vacuum gate valve as claimed in claim 13, comprising a spring mechanism which is arranged so that the closure disk is held so as to be pivotable in the closing direction relative to the support.

16. The vacuum gate valve as claimed in claim 1, wherein the vacuum gate valve is in the form of a vacuum transfer valve.

* * * * *

UNITED STATES PATENT AND TRADEMARK OFFICE
CERTIFICATE OF CORRECTION

PATENT NO. : 7,980,529 B2  Page 1 of 1
APPLICATION NO. : 12/135751
DATED : July 19, 2011
INVENTOR(S) : Daniel Seitz It is certified that error appears in the above-identified patent and that said Letters Patent is hereby corrected as shown below:

Title page
Change from:

(75) Inventor: Daniel Seitz, Balgaeh (CH)

To:

(75) Inventor: Daniel Seitz, Balgach (CH)

Signed and Sealed this
Twenty-second Day of November, 2011

David J. Kappos
*Director of the United States Patent and Trademark Office*